US008052904B2

United States Patent
Derrien et al.

(10) Patent No.: US 8,052,904 B2
(45) Date of Patent: Nov. 8, 2011

(54) PROCESS FOR FORMING CONTAINERS, WHICH COMPRISES A STEP OF FLUSHING THE INTERNAL VOLUME OF THE CONTAINER OF VARIABLE DURATION OVER AT LEAST ONE GIVEN COMPENSATION TIME

(75) Inventors: Mikael Derrien, Octeville sur Mer (FR); Pierrick Protais, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 0 days.

(21) Appl. No.: 12/677,256

(22) PCT Filed: Sep. 9, 2008

(86) PCT No.: PCT/FR2008/051603
§ 371 (c)(1),
(2), (4) Date: Mar. 9, 2010

(87) PCT Pub. No.: WO2009/044067
PCT Pub. Date: Apr. 9, 2009

(65) Prior Publication Data
US 2010/0201047 A1 Aug. 12, 2010

(30) Foreign Application Priority Data
Sep. 10, 2007 (FR) ...................................... 07 06326

(51) Int. Cl.
*B29C 49/78* (2006.01)
(52) U.S. Cl. ....... 264/40.3; 264/40.6; 264/519; 264/532
(58) Field of Classification Search .......................... None
See application file for complete search history.

(56) References Cited

U.S. PATENT DOCUMENTS

| 4,091,059 A | 5/1978 | Ryder |
| 5,145,632 A | 9/1992 | Denis et al. |
| 6,143,234 A * | 11/2000 | Van Horn et al. ............. 264/528 |
| 6,464,486 B1 | 10/2002 | Barray et al. |
| 2008/0164642 A1 | 7/2008 | Hirdina |
| 2008/0211125 A1 | 9/2008 | Derrien et al. |

FOREIGN PATENT DOCUMENTS

| DE | 10 2004 014 653 A1 | 10/2005 |
| EP | 0 406 146 A1 | 1/1991 |
| EP | 1 518 658 A1 | 3/2005 |
| FR | 2 649 035 B1 | 1/1991 |
| FR | 2 764 544 B1 | 12/1998 |
| FR | 2 881 979 A1 | 8/2006 |

OTHER PUBLICATIONS

International Search Report for PCT/FR2008/051603, Apr. 2009.

\* cited by examiner

*Primary Examiner* — Monica A Huson
(74) *Attorney, Agent, or Firm* — Sughrue Mion, PLLC

(57) ABSTRACT

Process for forming containers from a blank, preferably a preform, made of a thermoplastic, the containers being formed using a stretch-blow moulding machine of rotary type having a blow-moulding mould mounted on the periphery of a carousel rotated continuously about its axis, the blow-moulding mould operating in cyclic manner according to a blow-moulding cycle having the following steps: placing a preheated blank in a blow-moulding mould; closing the blow-moulding mould; blowing the blank in the blow-moulding mould; flushing the inside of the container with a cooling gas, by injecting air thereinto; grasping the blow-moulded container by external gripping means; and opening the blow-moulding mould, which process includes automatically varying the duration of the flushing step at each start of production of the containers, in a temporary and evolving manner for a few minutes to establish in the containers thermal conditions enabling the first containers to be formed at a temperature that gives them a final volume corresponding to the final volume of the containers formed during the stead-state operation of the stretch-blow moulding machine.

8 Claims, 2 Drawing Sheets

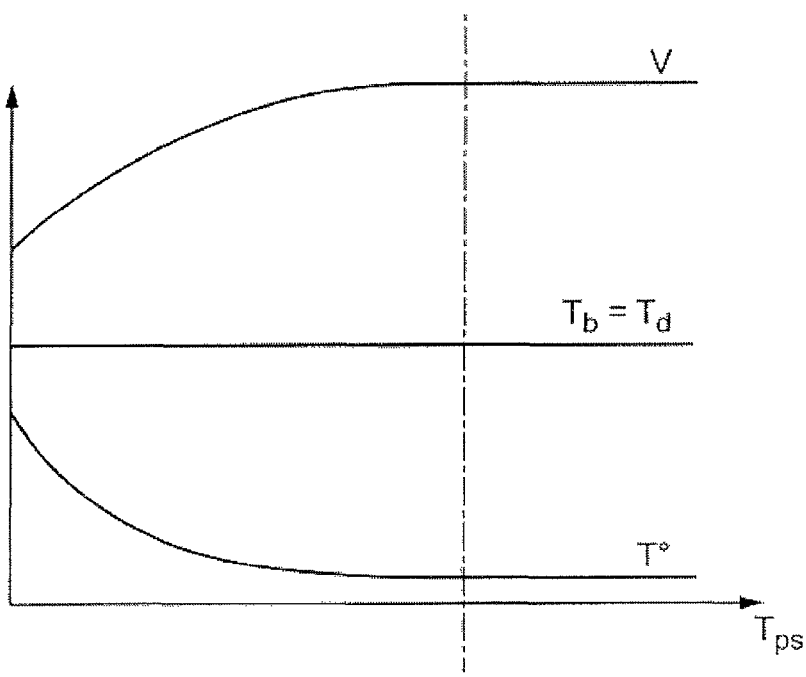
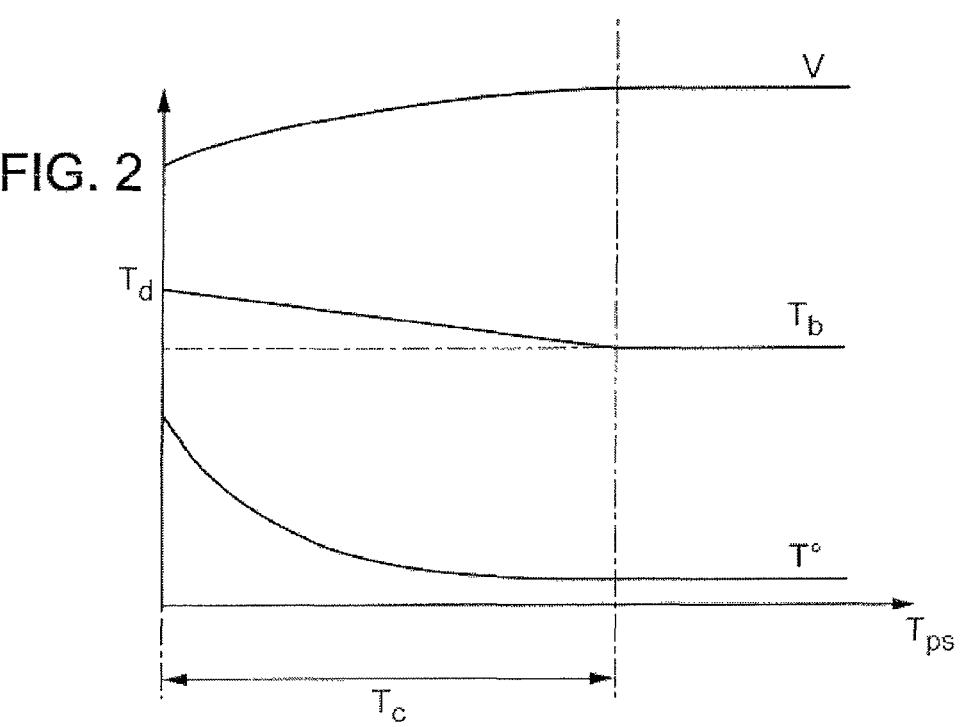

PROCESS FOR FORMING CONTAINERS, WHICH COMPRISES A STEP OF FLUSHING THE INTERNAL VOLUME OF THE CONTAINER OF VARIABLE DURATION OVER AT LEAST ONE GIVEN COMPENSATION TIME

CROSS REFERENCE TO RELATED APPLICATIONS

This application is a National Stage of International Application No. PCT/FR2008/051603 filed Sep. 9, 2008, claiming priority based on French Patent Application No. FR 07 06326 filed Sep. 10, 2007, the contents of all of which are incorporate herein by reference in their entirety.

FIELD OF THE INVENTION

The present invention relates generally to the field of forming containers made from thermoplastic material starting from blanks, such as PET preforms, by a stretch-blow moulding procedure.

DESCRIPTION OF THE PRIOR ART

The invention relates in particular to stretch-blow moulding machines of rotary type comprising several blow-moulding stations that are mounted on the periphery of a carousel.

Each blow-moulding station comprises, in particular, a blow-moulding mould, a blow-moulding device (generally including a blow-moulding nozzle) and a stretching device. According to a possible embodiment, the blow-moulding mould is of the clamshell type, i.e. it comprises two parts that open by moving apart while pivoting about a common axis.

Commonly, in order to form a container, a blank preheated to a softening temperature is placed in a blow-moulding mould that holds the impression of the container to be obtained. A blow-moulding nozzle is connected to the aperture of said blank and a blow-moulding fluid is injected under high pressure in order to press the material of the blank against the walls of the blow-moulding mould cavity.

In order to facilitate the forming of the container and the pressing of the thermoplastic material against the internal surface of the moulding cavity during blow-moulding, provision is made for a rod to stretch the blank in the blow-moulding mould and push it against the base wall of the blank.

As shown in more detail in the Applicant's document FR 2 764 544, the stretching rod is conventionally inserted into the aperture (neck) of the blank to be stretched and blow-moulded. Said rod slides axially along the longitudinal axis of the blow-moulding tube, an annular space being left free in order to allow the blow-moulding fluid to pass through.

It is known to a person skilled in the art that blow-moulding is not carried out in abstracto, but that the operations carried out during blow-moulding as well as the parameters of the machine (such as the mould temperature) depend on the intended use of the container. The temperature setting parameters of the mould, particularly in the case of containers intended for "hot fill", depend on the temperature of the filling liquid of said containers.

Thus, applications for which the filling or rinsing temperature is less than the glass transition temperature of PET do not require a mould temperature greater than 72° C.

In this case, the function of the mould temperature is to set the shape of the container as rapidly as possible, said temperature being, for example, of the order of 10° C. Said mould temperature will be, for example, of the order of 65° C. in order to obtain a shrinkage of the container volume, on output from the machine, that is almost identical to the shrinkage obtained after natural ageing of said container.

Conversely, other applications require significant heating of the mould. Thus, the hot fill (for example with liquids such as tea, pasteurised fruit juice, etc.) or pasteurisation of the content implies that the mould is heated to a predetermined temperature, in order to carry out heat-setting, as described in document FR2649035.

The temperature of the mould is reached (cooling or heating) by circulating a heat transfer fluid (hot water or oil for heating) in channels arranged in the wall of said mould, around the mould cavity.

However, during the start-up of the stretch-blow moulding machine, the temperature of the moulds is comprised between 120 and 160° C. while that of the blanks is approximately 120° C.

For this reason, during the first cycles of blow-moulding preforms in the moulds, contact with the blown material constituting the blank tends to cool the skin of the mould cavity (i.e. the outer surface of the mould cavity corresponding to the first millimeters' depth of the inner surface of the mould cavity). Said skin temperature of the mould cavity stabilizes after several blow-moulding cycles and therefore after several instances of contact of the blown softened material of the blank on the blow-moulding cavity.

Thus, the first containers blown in a blow-moulding mould are not blown at constant mould temperature, which results, in fine, in containers having different volumes.

Generally, the final volume of the bottle, on output from the blow-moulding machine, is less than the volume of the mould cavity. But the mould temperature has an influence on the final volume of the bottle. The colder the mould, the larger the volume of the bottle.

Differences in the volume of containers formed by a single blow-moulding mould have thus been noted, varying between 0.5 and 3% between the moment of start-up of the blow-moulding mould and the moment when the temperature of the skin of the mould cavity is stabilized.

Due to this difference in the volume of containers, and after they have been filled with content that has a constant volume, a greater or lesser void volume of oxygen is obtained inside the filled containers, leading to an increased risk of oxidation of the content. It is desirable to reduce as far as possible the air void volume contained in a container, once the latter has been filled with a constant quantity of content. For this reason, it is necessary to obtain containers with as accurate as possible an internal volume in order to thus reduce as far as possible the quantity of oxygen that can be present in the container, after the latter has been filled and capped.

Furthermore, with a greater volume of oxygen contained in the capped container, the void phenomenon that must be compensated by the bottle, after its filling and capping, is greater, which can possibly result in deformation of the container and therefore a filled container that cannot be marketed.

Said containers, the containing volume of which is variable and the content volume of which is fixed, show a variation in the fill level, such variation capable of leading unaware consumers to think that some containers do not contain the correct content volume.

Moreover, in view of current production speeds, which are increasingly high for the manufacture of containers, the scrapping of the first containers, formed before the stabilization of the dimensional characteristics of the container, cannot be envisaged.

The problem arises even more since stretch-blow moulding machines are often integrated into larger and more comprehensive installations in which machines are also provided upstream (for example the preform conditioning oven) and downstream (for example liquid filling or labelling machines), resulting in an increased risk that one of these machines may malfunction and that it may be necessary to stop all of the machines in order to repair it. Machine stoppages are therefore potentially more frequent, and from a purely financial point of view, the scrapping of a part of the production in order to wait for the temperature of the blow-moulding moulds to stabilize cannot be envisaged.

It is therefore particularly beneficial to carry out a process for the manufacture of containers that allows for improved dimensional stabilization of the container volume to be obtained and achieves this from the first moments of operation of the blow-moulding moulds.

Document FR2881979 proposes a process for controlling a container blow-moulding machine aiming to correct certain defects, such as the distribution of material. Means are implemented for the continuous control during production of the thickness of the walls of the containers leaving the different moulds.

As soon as a deviation appears, it is analysed and, depending on the circumstances, the operator, or the control system, can intervene in order to modify one or more of the parameters of the container forming recipe.

Said intervention is carried out a posteriori, during the production of the containers.

SUMMARY OF THE INVENTION

The present invention makes it possible to operate from the start of production in order to avoid scrappage associated with the start-up phase of the blow-moulding machine, scrappage which moreover affects several hundred containers.

The present invention relates to a process for forming containers from a blank, preferably a preform, made from a thermoplastic material, the containers being formed using a stretch-blow moulding machine of rotary type comprising at least one blow-moulding mould, mounted on the periphery of a carousel rotated continuously about its axis, the blow-moulding mould operating in a cyclic manner according to a blow-moulding cycle comprising the following steps:

a step of placing a preheated blank in a blow-moulding mould having, in a closed position, a mould cavity forming the cavity of the container to be blow-moulded,
  a step of closing the blow-moulding mould,
  a step of blow-moulding the blank in the blow-moulding mould by means of a blow-moulding tube and, approximately simultaneously,
  a step of stretching the blank by insertion of an elongation rod inside the blank, pushing against the base of the blank so as to facilitate the axial stretching of the blank,
  a step of flushing the inside of the container by injecting a cooling gas, particularly air,
  a step of raising the stretching rod,
  a step of grasping the blown container by external gripping means,
  a step of opening the blow-moulding mould,
  said process according to the invention comprising a step of implementing, in said container-forming cycle, a so-called "compensation period" in order to automatically vary, temporarily, the duration of said step of flushing the inside of said containers at each start of production and in order to establish thermal conditions in said containers allowing them to be formed at a temperature that gives them a final volume corresponding to the final volume of the containers formed during the cruising speed, or steady-state operation, of said stretch-blow moulding machine, i.e. during the period of production in which the temperature of the moulds is stabilized.

Still according to the invention, the process comprises a step of setting a value for the flushing time Td which is used for the first rotation of the carousel of the blow-moulding machine.

According to another provision of the invention, the process comprises a step of setting the duration of the compensation period, said duration, or compensation time Tc is of the order of a few minutes, i.e. a sufficient time for the dimensional changes in the blown containers to become negligible, or even zero.

Still according to the invention, the process consists of programming a variation in the duration of the flushing time Tb during the compensation period, according to a first-degree function of the type: $Tb = A \cdot t + Td$ when $t \leq Tc$ and where A is a coefficient that gives the slope of the compensation curve and, then, when $t > Tc$, the duration of the flushing time is constant: $Tb = A \cdot Tc + Td$.

According to a preferred arrangement of the invention, the coefficient A is of the order of 0.0003 to 0.0006; it is negative when the temperature of the moulds reduces during the compensation period Tc and positive when the temperature increases during said compensation period Tc.

Still according to the invention, the process consists of carrying out, during the compensation period, an automatic change in the duration of the flushing time, in an incremental manner, for example on each rotation of the carousel of the stretch-blow moulding machine.

The invention also relates to the installation, and in particular the stretch-blow moulding machine, that makes it possible to implement the process detailed above, said machine comprising a programmable logic controller and means of incorporating—a flushing time Td for the start-up of the machine and in particular the first rotation of the carousel,—a time Tc for the compensation period, and—a correction coefficient A which, during the compensation period Tc, changes the flushing time Tb.

Still according to the invention, the machine comprises means, in the programmable logic controller, of varying the duration of the flushing time Tb incrementally, on each rotation of the carousel of the machine, for example.

BRIEF DESCRIPTION OF THE DRAWINGS

This invention is now described using an example for illustration only that in no way limits the scope of the invention, on the basis of the following drawings, in which:

FIG. 1 gives a diagrammatic representation of the state of the art, and in particular the variations—in the volume V of the formed containers,—in the flushing time Tb and—in the temperature T° of the blow-moulding mould, from start-up of the machine and during the production of the containers, in the case of production during which there is a drop in the temperature of the mould during the first minutes of production of said containers, FIG. 2 shows, in the same manner, the variations—in the volume V of the formed containers,—in the flushing time Tb and—in the temperature T° of the blow-moulding mould, for a stretch-blow moulding machine operating according to the process of the invention, FIG. 3 also shows the state of the art and, as previously, the variations—in the volume V of the formed containers,—in the flushing time Tb and—in the temperature T° of the blow-moulding mould, but in the case of production during which, conversely, the mould temperature increases during the first minutes of production of said containers.

DETAILED DESCRIPTION OF THE INVENTION

Figure 3:
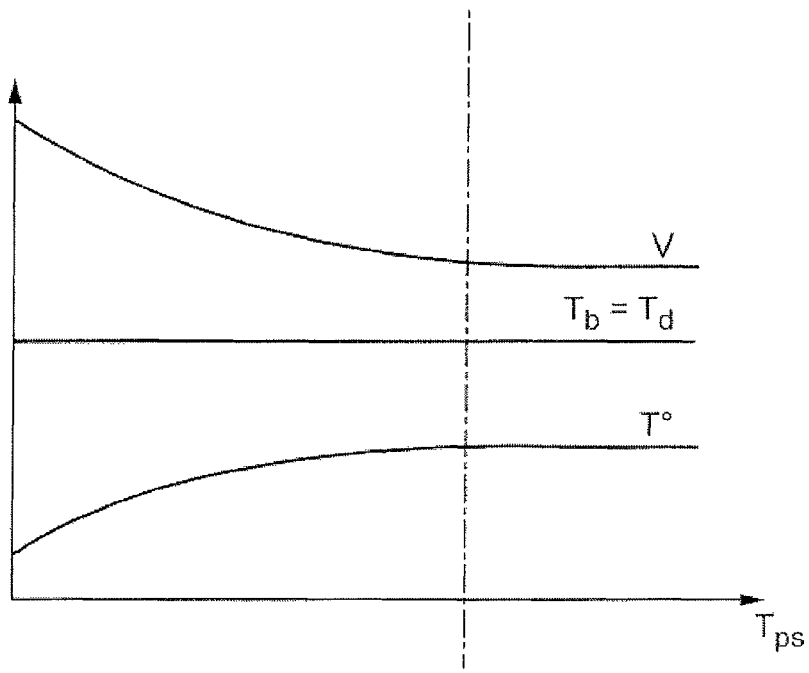

The present invention relates to improving a process for forming containers from a blank, preferably a preform, made from a thermoplastic material, the containers being formed using a stretch-blow moulding machine of rotary type comprising at least one blow-moulding mould, mounted on the periphery of a carousel rotated continuously about its axis, the blow-moulding mould operating in a cyclic manner according to a blow-moulding cycle comprising the following steps:
- a step of placing a preheated blank in a blow-moulding mould having, in a closed position, a mould cavity forming a cavity of the container to be blow-moulded;
- a step of closing the blow-moulding mould;
- a step of blow-moulding the blank in the blow-moulding mould by means of a blow-moulding tube and, approximately simultaneously, a step of stretching the blank by inserting a stretching rod inside the blank, pushing against the base of the blank so as to facilitate the axial stretching of the blank;
- a step of flushing the inside of the container by injection of a gas, in particular air, through a plurality of apertures provided in the elongation rod, in order to cool the container;
- a step of raising the stretching rod;
- a step of grasping the blown container by external gripping means;
- a step of opening the blow-moulding mould.

As shown more clearly in FIG. 1, according to the prior art, it is noted that the temperature T° of a blow-moulding mould reduces at the start of container production. Said reduction of the temperature of the inside wall of the mould, following the start-up of the machine, results from the preform coming into contact with said inside wall of said mould. In certain production situations, as detailed above, the softened material of the preform is colder than the temperature of the wall of the mould cavity of the blow-moulding mould (see curve at the bottom of FIG. 1).

Commonly, the flushing time Tb is constant throughout the operation of the blow-moulding mould (see curve in the middle of FIG. 1); said flushing time Tb has a value Td that is normally programmed before the start-up of the machine and is maintained for the entire duration of the production of the containers.

The reduction of the temperature of the moulds, combined with the stability of the flushing causes a dimensional deviation in the containers, which is reflected by an increase in the volume V of the containers formed between the start-up of the blow-moulding mould and the moment when the mould temperature stabilizes (see curve at the top of FIG. 1).

It has already been stated above that the variation in the volume of the formed container, between the start of production of the mould and the moment when the mould temperature is stable, is comprised between 5 and 10%.

In order to reduce said volume variation percentage, it is preferably proposed according to the invention to vary the duration of the flushing time Tb at least during the stabilization time of the temperature of the inside wall of the blow-moulding mould in order to compensate for the temperature change of said inside wall and especially to establish, in the different containers, a temperature allowing them to have a volume that from the start of production adopts a value corresponding to the value obtained in normal production when the steady-state operation of the machine is established and the temperature of the moulds stabilized.

The longer the time Tb of flushing with air that cools the container, the greater the final volume V of said container. It is therefore possible, by acting on the duration of the flushing time Tb, to counterbalance the phenomenon of cooling of the blow-moulding mould at the start of production which results in said increase in the volume of the formed container.

In other words, according to the process of the invention, the duration of the flushing step depends on the number of blow-moulding cycles carried out by the blow-moulding mould following the start-up of the first blow-moulding cycle of the blow-moulding mould, as a result of which the temperature variation of the skin of the mould cavity is taken into account by means of the temperature difference between the temperature of the skin of the mould cavity and the temperature of the heated blank coming into contact with said mould cavity during the step of blow-moulding, making it possible to achieve the production of containers having a more stable internal volume over time and, more particularly, on the start of production of the blow-moulding mould.

The process according to the invention, illustrated by the results in FIG. 2, therefore comprises a step consisting of programming a temporary period of change of the flushing time, i.e. a compensation period during which the flushing duration Tb will be greater than the duration applicable to stabilized production. Said compensation period Tc corresponds to the time period during which the temperature of the mould cavity changes before stabilization of the temperature of the cavity, i.e. between the start of production and moment that can be described as steady-state operation for the blow-moulding machine.

To this end, firstly, the compensation time Tc is determined, i.e. the time during which the temperature of the skin of the mould cavity changes before stabilizing, using pre-testing on the stretch-blow moulding machine; said compensation time Tc is set for example at 180 seconds.

Preferably, the process also comprises a step of setting the maximum variation of the flushing time Tb. On each blow-moulding cycle, and for the entire duration of the compensation time Tc, the value of said flushing time Tb decreases automatically, as in FIG. 2, to stabilize when the compensation period Tc is ended and the machine is running in steady-state operation.

Once said compensation time Tc has been determined and set, the flushing time Tb is determined and set, taking account of the displayed value Td for the first blow-moulding cycle, or the first rotation of the carousel.

Said flushing duration Tb changes with time, corresponding for example to the application of a simple $1^{st}$ degree equation of the type $Tb = A \cdot t + Td$, where Td is the flushing time entered into the programmable logic controller for the first rotation of the carousel and where A is a coefficient that depends on the conditions of use of the blow-moulding machine and containers to be formed, the value of which ranges from 0.0003 to 0.0006; Tc corresponds to the duration of the compensation period and its value varies.

In the equation, t adopts a value that changes, for example, incrementally between Tc and zero; Tc can have a chosen value between 2 and 3 mn.

The change in the flushing time Tb can therefore be established, preferably, with a linear variation during the compensation time Tc (see curve in the middle of FIG. 2). Once said compensation time Tc has elapsed, the flushing time Tb is constant; it corresponds to: A·Tc+Td with, for the coefficient A, a negative value taking account of the fact that the temperature of the moulds, at the start, is greater than that of the preforms and that it decreases on contact with the preforms before stabilizing.

Figure 4:
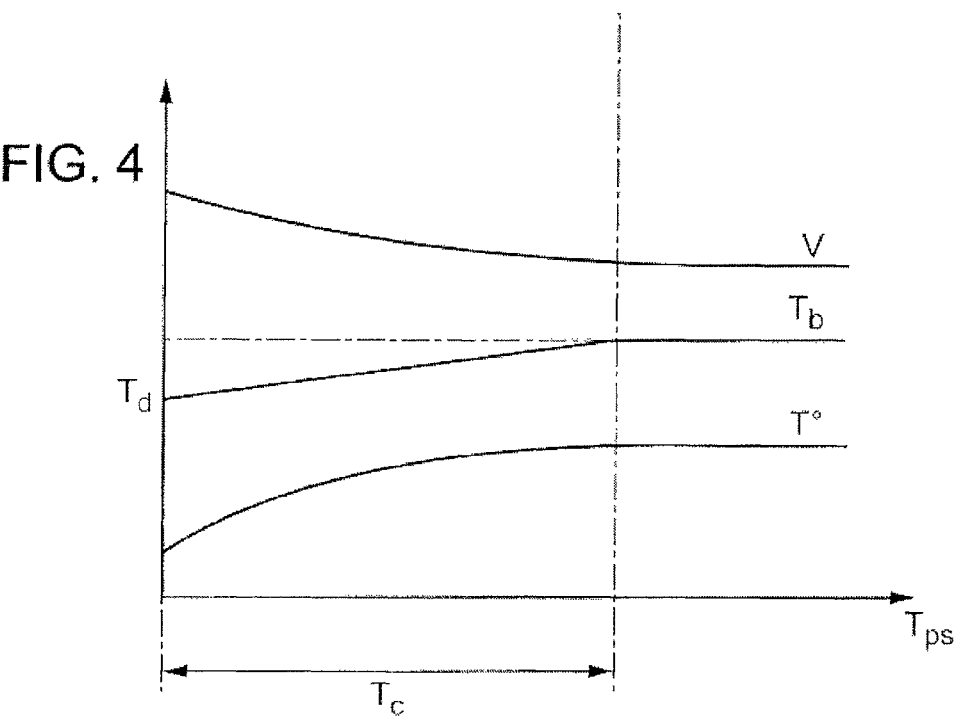
FIG. 4 shows, in the case in FIG. 3, the variations—in the volume V of the formed container,—in the flushing time Tb and—in the temperature T° of the blow-moulding mould, but for a stretch-blow moulding machine operating according to the process of the invention.

FIGS. 3 and 4 show the variations that can be seen in the container forming scenario in which the mould temperature is lower than that of the preforms, i.e. the moulds are heated and their temperature T° changes on contact with the preforms (curve at the bottom of FIG. 3), resulting in a reduction of the volume V of the bottles (curve at the top of the same FIG. 3) between the start-up of production and steady-state operation.

FIG. 3 shows said variations in V and T° that can be seen with the current state of the art for which the flushing time Tb is set at the start with a value Td that remains constant throughout the production of the containers.

FIG. 4 shows the stability of the volume V of the containers obtained by application of the process according to the invention. The flushing time Td displayed for the start-up of the production of the containers also changes by applying the same above-mentioned first-degree equation: Tb=A·t+Td with, in this equation, a positive coefficient A.

The flushing time Td displayed for the start-up of the production of the containers also changes by applying the same above-mentioned first-degree equation: Tb=A·t+Td with, in this equation, a positive coefficient A.

On production start-up, the flushing time Tb is equal to the value Td entered by the operator into the programmable logic controller, then said time Tb changes, incrementally, on each rotation of the carousel, for example, and, at the end of the compensation period Tc, the flushing time Tb is equal to: A·Tc+Td with a positive coefficient A, comprised between 0.0003 and 0.0006.

The changes in the flushing time Tb also has an influence on the total time of the container forming cycle. In the case of FIG. 2, the flushing time Tb changes towards a reduction that makes it possible to increase, for example, the time for which the blow-moulding pressure is maintained during steady-state operation.

Said corrected flushing time Tb is of the order of a few fractions of a second; it varies between said few fractions of a second at the start of production of the containers and zero at the end of the compensation period Tc, when the temperature of the moulds is stabilized and when the dimensional changes in the blown containers become negligible, even zero.

However, it is also possible to provide a non-linear variation for example of the second-degree type or other, in order to program a change in the duration of the flushing time Tb.

Preferably, the duration of the flushing time Tb, during the compensation period Tc, is modified automatically at regular time intervals, and even more preferably, the duration of the flushing time, during the compensation time Tc, is modified incrementally after each complete rotation of the blow-moulding mould on the carousel.

Using the process according to the invention, it has been possible to obtain a reduction of between 50 and 75% in the dimensional variations of the internal volume of the containers formed during the compensation time of the blow-moulding mould, i.e. before the temperature stabilization of the mould cavity.

The invention claimed is:

1. Process for forming containers from blanks comprising preforms made from thermoplastic material, the containers being formed using a stretch-blow moulding machine of a rotary type comprising at least one blow-moulding mould, mounted on a periphery of a carousel rotated continuously about an axis, the blow-moulding mould operating in a cyclic manner according to a forming cycle, the process comprising:
    a step of placing a preheated blank in the blow-moulding mould having, in a closed position, a mould cavity forming a cavity of the container to be blow-moulded,
    a step of closing the blow-moulding mould,
    a step of blow-moulding the blank in the blow-moulding mould with a blow-moulding nozzle and, approximately simultaneously,
    a step of stretching the blank by inserting an elongation rod inside the blank, and pushing against a base of the blank to facilitate an axial stretching of the blank,
    a step of flushing an inside of the container by injecting air for a flushing time Tb,
    a step of raising the elongation rod,
    a step of grasping the blown container by an external grip,
    a step of opening the blow-moulding mould, and
    a step of setting, at each production start-up of the stretch-blow moulding machine, a compensation period during which a duration of the flushing time Tb is automatically varied, temporarily, during a predetermined time at each start-up of the production of the containers, for first several carousel rotations until a temperature of the blow-moulding mould is stabilized, after which the flushing time Tb becomes constant, thereby establishing thermal conditions in said containers at which the containers are formed during the first several carousel rotations at the production start-up at the temperature of the blow-moulding mould that gives the containers a final volume corresponding to the final volume of the containers formed during the steady-state operation of said stretch-blow moulding machine, during the period of production when the temperature of the blow-moulding mould is stabilized.

2. Process for forming containers according to claim 1, wherein the step of setting further comprises:
    setting a value of an initial flushing time Td used for the first rotation of the carousel of the stretch-blow moulding machine.

3. Process for forming containers according to claim 2, further comprising:
    setting the predetermined time of a duration Tc of the compensation period during which the flushing time Tb is automatically varied during the first several carousel rotations.

4. Process for forming containers according to claim 3, further comprising:
    a step of programming a variation in the flushing time Tb, during the compensation period duration Tc, according to a first-degree function Tb=A·t+Td where t≦Tc, and A is a coefficient having an absolute value in a range of 0.0003 to 0.0006,
    wherein, when t becomes greater than the compensation period duration Tc, the flushing time Tb of the containers becomes constant: Tb=A·Tc+Td.

5. Process for forming containers according to claim 4, wherein the coefficient A comprises a positive value when the temperature of the blow-moulding mould is greater than that of the preheated blank or negative value when the temperature of the blow-moulding mould is less than that of the preheated blank.

6. Process for forming containers according to claim 5, further comprising:
    a step of programming a variation mode of the compensation period duration, wherein, in said variation mode, the flushing time Tb incrementally changes after each complete rotation of the carousel.

7. The process for forming containers according to claim 1, wherein the step of setting further comprises:
   setting the duration of the flushing time Tb to change after each carousel rotation is completed, during the several first carousel rotations.

8. The process for forming containers according to claim 1, wherein the step of setting further comprises:
   setting the duration of the flushing time Tb during the several first carousel rotations based on a temperature difference between a temperature of a skin of the mould cavity and a temperature of the preheated blank.

* * * * *